May 14, 1935.  I. L. DUNN  2,001,458

SAFETY PLUG

Filed March 20, 1933

INVENTOR
Irwin L. Dunn
BY
ATTORNEY

Patented May 14, 1935

2,001,458

UNITED STATES PATENT OFFICE 2,001,458

SAFETY PLUG

Irwin L. Dunn, Tulsa, Okla.

Application March 20, 1933, Serial No. 661,781

7 Claims. (Cl. 220—46)

My invention relates to safety plugs, and more particularly to a device of that character for confining fluid under pressure in the dead end of a flow line, a gas cylinder, or other conduit or container in which liquid or gas under artificial or inherent expansion pressure is confined; the invention particularly relating to a plug of this character for sealing cylinders of carbon dioxide or other highly expansive gases for shipment or storage, and has for its principal object to provide a closure that may be easily and quickly applied to and removed from the cylinder without damage to the sealing element, but from which the plug cannot be removed while the cylinder is under internal pressure.

In accomplishing this object I have provided improved details of structure, the preferred form of which is illustrated in the accompanying drawing, wherein.

Figure 1:
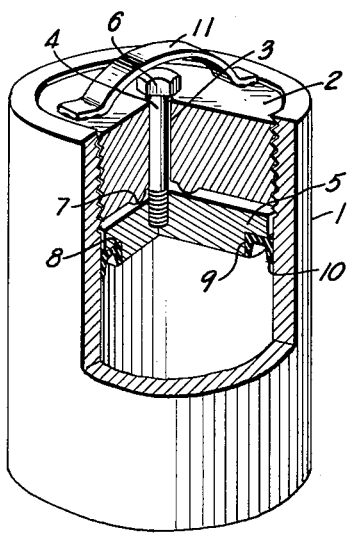
Fig. 1 is a perspective view of a cylinder equipped with a safety plug embodying my invention, a part of the cylinder and plug being broken away for better illustration.
Figure 3:
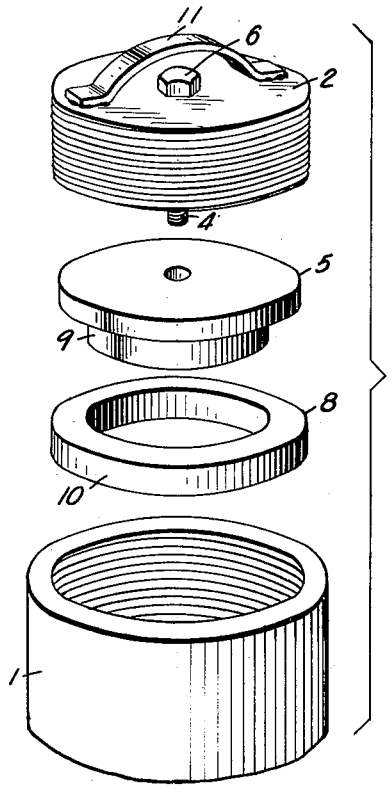
Fig. 3 is a detail perspective view of the elements of the plug in spaced relation.
Figure 2:
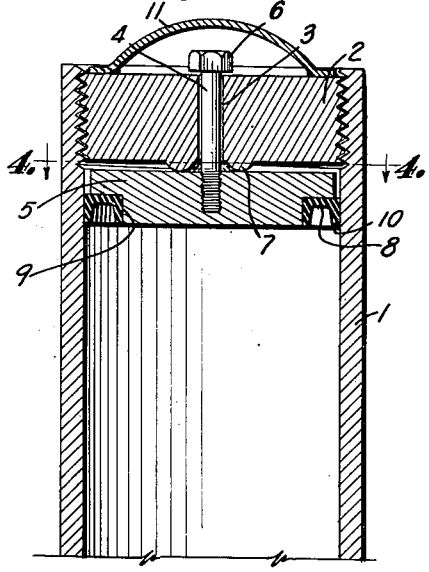
Fig. 2 is a central, longitudinal section of a portion of a cylinder and of a plug, embodying the invention, applied thereto.
Figure 4:
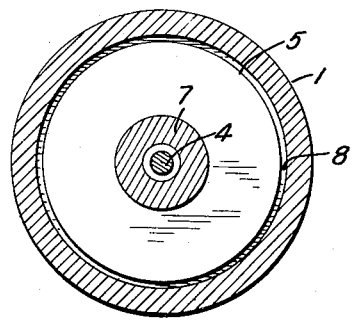
Fig. 4 is a cross section on the line 4—4, Fig. 2.

Referring more in detail to the drawing:

1 designates a cylinder, here shown as of plain tubular form, merely for purpose of illustration of use of the plug without intention to limit the form of the cylinder.

2 designates a screw-plug, preferably adapted for quick threading into the cylinder 1 with some play in the threaded connection to permit limited swiveling of the plug, and having a central aperture 3 through which a coupling pin, preferably consisting of a bolt 4, is extended so that the threaded end of the bolt will project beyond the inner face of the screw-plug for attachment of a follower-plate 5. The bolt 4 has a head 6 adapted to engage the outer face of the screw-plug to clamp the follower-plate to the screw-plug, and the inner face of the plug is preferably provided with a circular rib 7 for limiting surface contact between the screw-plug and follower-plate to prevent rotation of the follower-plate with the screw-plug while the device is applied to or removed from a cylinder.

The follower-plate 5 is of sufficiently less diameter than the screw-plug to pass freely into and out of the cylinder without contact with the cylinder wall, but sufficiently close thereto to form a substantial backing for a packing ring 8, preferably of channel form, seated in a groove 9 in the outer edge of the plate with the channel of the ring facing outwardly so that its free flange 10 may be thrust laterally to sealing contact with the cylinder wall in response to pressure of fluid entering the ring channel from the interior of the cylinder.

I prefer to provide a handle 11 on the outer end of the screw-plug for ease in applying the plug to and removing the same from a pipe or cylinder.

A device constructed and assembled as described may be applied to a pipe or cylinder by thrusting the follower-plate, with its packing ring, into the end of the pipe or cylinder and screwing the plug 2 thereinto, the screw-plug turning on the coupling pin without rotating the follower-plate, the packing ring moving over the inner face of the pipe or cylinder without much friction and the plate moving to place without contact with the confining wall.

When the plug is in place, fluid under pressure, such as expansive gas, supplied to the pipe or cylinder, will enter the channel of the packing ring and force the loose flange of the ring to sealing contact with the inner surface of the pipe or cylinder and with the walls of the groove in the follower-plate to prevent escape of the fluid.

When the cylinder is under internal pressure the follower-plate is forced against the plug body, binding the plug threads against those of the cylinder and locking the plug in place so that it cannot be removed or become loosened.

When pressure on the plug has been relieved by removal of contents of the cylinder, it may be removed by turning the screw-plug element to unthread it from the pipe or cylinder, the screw-plug rotating on the coupling pin without rotating the follower-plate, but drawing the plate outwardly so that the packing ring merely slides along the surface of the pipe or cylinder without grinding action that might tend to reduce or mar the sealing flange.

It is apparent from the foregoing that I have provided a safety plug which may be easily and quickly applied to a pipe or cylinder without damage to its sealing element and which, when in place, will afford a closure having sealing contact with the wall of the confining body proportionate to the pressure of the fluid medium confined in said body.

What I claim and desire to secure by Letters Patent is:

1. A safety plug for a tubular body including a retainer adapted for removable, locked mounting in said body, and having a boss on its inner face, a follower, a bolt extended loosely through the retainer and threadedly attached to the follower, and a packing ring on the follower including a flexible member compressible against the wall of said body by fluid under pressure in said body.

2. A safety plug for a tubular body including a retainer adapted for removable, locked mounting on said body and having a boss on its inner face, a follower having an internally threaded socket, a bolt extended loosely through the retainer and threadedly engaged in the socket, and a packing ring on the follower including a flexible member compressible against the wall of said body by fluid under pressure in said body.

3. A safety plug for a tubular body including a retaining member having rotational engagement with the walls of the tubular body, a follower member of less diameter than the inner diameter of the tubular body, an outwardly expansive packing ring on the follower member inductive to sealing contact with the wall of the tubular body in response to fluid presure in said body, and means supporting said follower member for limited movement to and from said retaining member whereby said follower member is free to move into bearing contact with the retaining member in response to said pressure to prevent rotation of said retaining member and free to move out of bearing contact upon absence of said pressure to allow rotation of the retaining member.

4. A safety plug for a tubular body including a retaining member having screw threaded engagement with the wall of the tubular body, a follower member of less diameter than the inner diameter of the tubular body, an outwardly expansive packing ring on the follower member inductive to sealing contact with the wall of the tubular body in response to fluid presure in said body, and means supporting said follower member for limited movement to and from said retaining member whereby said follower member is free to move into bearing contact with the retaining member to prevent unscrewing thereof and free to move from said retaining member upon absence of said pressure to allow unscrewing of the retaining member.

5. A safety plug for a tubular body including a retaining member provided with an axial opening and having rotational engagement with the walls of the tubular body, a follower member of less diameter than the inner diameter of the tubular body, an outwardly expansive packing ring on the follower member inductive to sealing contact with the wall of the tubular body in response to fluid pressure in said body, a swivel member extending loosely through said opening and connected with said follower and having a head spaced from said retaining member when the follower member is engaged with said retaining member to provide limited movement of the follower member to and from the retaining member whereby said follower member is free to move into engagement with the retaining member responsive to said pressure to prevent swivel movement of the retaining member on said swivel member and out of said engagement in the absence of said pressure to allow swivel movement of said retaining member on the swivel member.

6. A safety plug for a tubular body including a retaining member having rotational engagement with the walls of the tubular body, a follower member of less diameter than the inner diameter of the tubular body, a boss on one of the members for frictional bearing contact against the other member, an outwardly expansive packing ring on the follower member inductive to sealing contact with the wall of the tubular body in response to fluid pressure in said body, and means supporting said follower member for limited movement to and from said retaining member whereby said follower member is free to move to cause bearing contact of said boss in response to said pressure to prevent rotation of said retaining member and release of said bearing contact upon absence of said pressure to allow rotation of the retaining member.

7. A safety plug for a tubular body including a retaining member provided with an axial opening and having rotational engagement with the walls of the tubular body, a follower member of less diameter than the inner diameter of the tubular body and having a socket aligned with said axial opening, an outwardly expansive packing ring on the follower member inductive to sealing contact with the wall of the tubular body in response to fluid pressure in said body, a swivel member extending loosely through said axial opening and anchored in said socket and having a head spaced from said retaining member when the follower member is engaged with said retaining member to provide free limited movement of the follower member relatively to the retaining member whereby said follower member is free to move into engagement with the retaining member responsive to said pressure to prevent swivel movement of the retaining member and to move out of said engagement in the absence of said pressure to allow swivel movement of said retaining member.

IRWIN L. DUNN.